United States Patent [19]
Matama

[11] Patent Number: 6,118,907
[45] Date of Patent: *Sep. 12, 2000

[54] IMAGE PROCESSING METHOD AND SYSTEM

[75] Inventor: Tooru Matama, Kanagawa-ken, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/943,597

[22] Filed: Oct. 3, 1997

[30] Foreign Application Priority Data

Oct. 3, 1996 [JP] Japan .................................... 8-263182

[51] Int. Cl.$^7$ .............................. G06K 9/40; G06K 9/00; H04N 1/40; G03F 3/08
[52] U.S. Cl. .......................... 382/274; 382/132; 358/461; 358/520
[58] Field of Search .................................... 382/232, 132, 382/264, 274, 169; 358/447, 461, 520; 378/98

[56] References Cited

U.S. PATENT DOCUMENTS

| | | | |
|---|---|---|---|
| 4,239,385 | 12/1980 | Hujer | 355/71 |
| 4,394,089 | 7/1983 | McIntosh et al. | 358/88 |
| 4,794,531 | 12/1988 | Morishita et al. | 382/132 |
| 5,012,333 | 4/1991 | Lee et al. | 358/520 |
| 5,319,719 | 6/1994 | Nakazawa et al. | 382/132 |
| 5,778,054 | 7/1998 | Kimura et al. | 379/93.23 |
| 5,907,642 | 5/1999 | Ito | 382/274 |

FOREIGN PATENT DOCUMENTS

| | | | |
|---|---|---|---|
| 58-66929 | 4/1983 | Japan | G03B 27/00 |
| 6 410819 | 2/1989 | Japan | G03B 27/72 |
| 6 435542 | 2/1989 | Japan | G03B 27/32 |
| 2 226375 | 9/1990 | Japan | G06F 15/68 |
| 6 242521 | 9/1994 | Japan | G03B 27/73 |

*Primary Examiner*—Thomas D Lee
*Assistant Examiner*—Wenpeng Chen

[57] ABSTRACT

In a first image processing apparatus, a digital image signal representing an image before being subjected to shutting light processing, and an unsharp image signal representing an unsharp mask image used for shutting light processing are formed. The unsharp image signal is obtained from the digital image signal. Compression processing is performed on the digital image signal to form a compressed digital image signal. Compression processing is also performed on the unsharp image signal, thereby forming a compressed unsharp image signal. The compressed digital image and unsharp image signals are stored on a storage medium, and then delivered to a second image processing apparatus. In the second image processing apparatus, the compressed digital image and unsharp image signals are reproduced from the storage medium, and decompression processing is performed on the compressed digital image and unsharp image signals to obtain decompressed digital image and unsharp image signals. Shutting light processing is then performed in the second image processing apparatus by using both the decomposed digital image and unsharp image signal.

22 Claims, 3 Drawing Sheets

IMAGE PROCESSING METHOD AND SYSTEM

BACKGROUND OF THE INVENTION

1. Field of the Invention

This invention relates to an image processing method and system. This invention particularly relates to an image processing method and system, wherein shutting light processing is carried out under desired conditions in a second image processing apparatus by utilizing a digital image signal, representing an image before being subjected to the shutting light processing, and which is formed bya first image processing apparatus, and an unsharp image signal, which represents an unsharp mask image used for the shutting light processing.

2. Description of the Prior Art

Recently, research of digital photo printers has been carried out. With the digital photo printers, an image recorded on photographic film (such as negative film or reversal film) or which is recorded on printed matter is photoelectrically read out. The obtained image signal is then converted into a digital signal which is then subjected to various kinds of image processing to produce a processed image signal. Thereafter, recording light is modulated with the processed image signal, and a photosensitive material such as photographic paper is scanned with and exposed to the modulated recording light.

In this manner, a visible image is printed on the photosensitive material.

With the digital photo printers, layouts of printed images, such as combining a plurality of images, dividing an image, and editing characters and images, as well as various kinds of image processing, such as color/image density adjustment, conversion of magnification, and contour emphasis, may be freely carried out. Therefore, prints edited and processed freely in accordance with certain applications can be obtained. Also, where conventional surface exposure techniques are employed, the image density information recorded on film, or the like, cannot be reproduced perfectly due to limitations imposed upon the reproducible image density range of photosensitive materials. However, with digital photo printers, prints can be obtained such that the image density information can be reproduced approximately perfectly. Alternately, prints may be obtained with image processing, or the like, by perfectly utilizing the image density information recorded on film.

Basically, digital photo printers comprise of a read-out means for reading out an image recorded on an image storage sheet, such as film, and an image reproducing means. The image reproducing means carries out image processing on an image signal detected by the read-out means, and adjusts exposure conditions. Also, the image reproducing means carries out a scanning exposure operation on a photosensitive material under the adjusted exposure conditions, and carries out development processing on the exposed photosensitive material. Further, the image reproducing means can reproduce a visible image from the image signal obtained from the image processing, and can display the visible image on a monitor.

For example, in a read-out apparatus for reading out an image recorded on film using slit scanning, reading light having a slit-like shape extending in a one-dimensional direction irradiates to the film, and the film is moved in a direction approximately normal to the one-dimensional direction. (Alternatively, the reading light and a photoelectric converting device are moved in the direction, which is approximately normal to the one-dimensional direction.) In this manner, the film is scanned in a two-dimensional direction. An image of the light, which has passed through the film and carries the film image information, is then formed on a light receiving face of the photoelectric converting device, such as a CCD line sensor, and is photoelectrically converted into a light amount signal. This light amount signal is amplified and then converted into a digital signal by an analog-to-digital converter. Thereafter, the digital signal is subjected to various kinds of image processing, such as compensation for a fluctuation in the characteristics among the CCD elements of the CCD line sensor, image density conversion, and conversion of magnification, and is transferred to a reproducing means.

In the reproducing means, for example, a visible image is reproduced from the received image signal and displayed on a display device, such as a cathode ray tube (CRT) display device. When necessary, an operator, viewing the reproduced image will correct the gradation, color and image density of the reproduced image (i.e., sets the set-up conditions). Where the reproduced image is judged as being an acceptable finished print, the image signal is transferred as the recording image information into a development means or a monitor.

In an image reproducing apparatus, in which the image reproduction with raster scanning (i.e., light beam scanning) is utilized, three kinds of light beams corresponding to exposure of the layers (which are formed on a photosensitive material and are sensitive to three primary colors, e.g. red (R), green (G), and blue (B)) are modulated in accordance with the recording image information, and then deflected in a main scanning direction (which corresponds to the aforesaid one-dimensional direction). Also, the photosensitive material is conveyed in a sub-scanning direction, which is approximately normal to the main scanning direction. (i.e. the photosensitive material is moved with respect to the deflected light beams and in the sub-scanning direction). In this manner, the photosensitive material is scanned in two-dimension with the light beams. Since these light beams have been modulated in accordance with the recording image information, and the image read out from the film is thereby reproduced on the photosensitive material.

The photosensitive material is then subjected to development processing, which is dependent on the particular kind of photosensitive material. For example, where the photosensitive material is a silver halide photographic material, it is subjected to the development processing comprising the steps of color development, bleach-fix, washing, drying, and the like. A finished print is thereby obtained.

Such a photosensitive material can record a comparatively wide range of luminance of the object. However, the maximum image density on the photosensitive material is limited. Therefore, in cases where a print of a scene having a large difference in luminance is obtained with an ordinary printing technique, details become imperceptible due to insufficient gradation in either one of a bright portion (a highlight) and a dark portion (a shadow) on the print. For example, in cases where a picture of a person is taken against the light, if the picture is printed such that the image of the person may become clear, the bright portion (such as the sky region) will become white and its details will become imperceptible. Also, if the picture is printed such that the bright portion, such as the sky region, may become clear, the image of the person will become black and its details will become imperceptible. In order to solve the problems, a shutting light technique or a masking print technique has heretofore been employed.

With the shutting light technique, an ordinary level of exposure is given to a region having an intermediate level of image density in a scene. Also, a long time of exposure is given selectively to a region, which has to become white such that the details of the region are imperceptible on the print, by using a perforated blocking sheet. Further, as for a region, which has to become black such that the details of the region are imperceptible on the print, the exposure time is kept selectively short by using a blocking sheet. In this manner, the print is obtained such that the contrast of each object may be kept appropriate, and the details of the highlight and the shadow may be kept perceptible. At least one such method has been proposed, in which unsharp image film photographically formed by the negative-positive reversal of the original image film is used as a blocking sheet for locally controlling the exposure time, and in which printing is carried out by superposing the original image film on the unsharp image film.

Also, various masking print techniques have been proposed in, for example, Japanese Unexamined Patent Publication Nos. 58(1983)-66929 and 64(1989)-35542 and Japanese Patent Publication No. 64(1989)-10819. With the proposed masking print techniques, the same effects as those of the shutting light technique may be obtained by locally changing the brightness of a light source for illuminating a photographic original image.

With the apparatus proposed in Japanese Unexamined Patent Publication No. 58(1983)-66929, a CRT is employed as the illuminating light source, and a photometric operation with memory scanning is carried out on an original image. In this manner, an unsharp mask signal is formed from the color original image. In an exposure mode, a CRT is controlled with the unsharp mask signal, and the contrast is thereby controlled such that the original image may be reliably recorded within the contrast reproduction limit of a photosensitive material.

With the apparatus proposed in Japanese Unexamined Patent Publication No. 64(1989)-35542, a CRT is employed as the illuminating light source, and an optical path for the photometric operation carried out on an original image and an optical path for the exposure of a photosensitive material are provided such that they may be changed over to each other. Also, a signal for controlling the luminance of the CRT during the exposure and thereby correcting the gradation and the saturation of the reproduced image is formed in accordance with the photometric signal obtained from the original image. Further, a signal for displaying the reproduced image on a monitor is formed. The image displayed on the monitor is viewed, and the amount of light of the CRT is thereby controlled such that a desired image may be reproduced.

With the apparatus proposed in Japanese Patent Publication No. 64(1989)-10819, a matrix device, such as a liquid crystal, which is capable of locally changing the light transmittance, is located between a uniform surface light source and an original image. The transmittance of the liquid crystal is controlled in accordance with the photometric signal obtained from the original image, and the contrast of the reproduced image is thereby adjusted.

Further, for example, in Japanese Unexamined Patent Publication No. 6(1994)-242521, a method is proposed wherein, in order for the gray balance in image reproduction to be corrected, conversion is carried out such that the maximum image density value and the minimum image density value of each color on an original image may become equal to predetermined values on the reproduced image. With the proposed method, the control of the gradation can be carried out for each of the frames of film. Therefore, as for a scene having a large difference in luminance, the gradation of the entire area of the image can be rendered soft such that the range of luminance of the scene may fall within the dynamic range of the photosensitive material. In this manner, the problems can be prevented from occurring in that the details of the highlight and the shadow become imperceptible due to insufficient gradation.

With the aforesaid shutting light technique and the aforesaid masking print techniques, the blocking sheet must be used, thereby requiring a very high level of technical operation. Additionally, considerable labor and time are required to form the unsharp image film.

Also, with the aforesaid apparatuses described in Japanese Unexamined Patent Publication Nos. 58(1983)-66929 and 64(1989)-35542 and Japanese Patent Publication No. 64(1989)-10819, the contrast of a comparatively large structure can be reproduced by adjusting with the distribution of the luminance of the illuminating light source. However, local structures in the reproduced image correspond to the projected image of the original image film. Therefore, the aforesaid apparatuses have drawbacks in that the reproduction of colors of the local structures, including their edges, cannot be freely controlled. Specifically, the sharpness of the edges, and the gradation of over-exposure portion and under-exposure portions, or the like, in the original image cannot be controlled freely.

Further, with the aforesaid apparatuses described in Japanese Unexamined Patent Publication Nos. 58(1983)-66929 and 64(1989)-35542 and Japanese Patent Publication No. 64(1989)-10819, the processing for the photometric operation and the exposure is carried out sequentially. Therefore, the problems occur in that the processing capacity cannot be maintained. Also, problems occur in that the printed image is disturbed due to the change in the distance of movement of the original image between when the photometric operation is performed and when the exposure is carried out. Further, with the apparatus described in Japanese Patent Publication No. 64(1989)-10819 which uses the liquid crystal, since the transmittance of the liquid crystal is at most approximately 30%, exposure time cannot be minimized. Furthermore, since the tube surface of the CRT is covered with glass, the side inward from the glass becomes luminous. Therefore, even if the film is brought into close contact with the tube surface of the CRT, a substantial spacing will still occur between the luminous surface of the CRT and the film. Accordingly, as to the apparatus proposed in Japanese Unexamined Patent Publication No. 64(1989)-35542, which displays an image represented by a photometric signal, a blur occurs in the photometric and image forming system due to the spacing between the luminous surface of the CRT and the film surface during the photometric operation. Therefore a clear monitor image cannot be obtained.

With the method proposed in Japanese Unexamined Patent Publication No. 6(1994)-242521, even though these types of problems can be prevented because the details of the highlight and the shadow become imperceptible due to insufficient gradation, other problems occur, in that the contrast of each object is degradul and the printed image becomes monotonous.

Therefore, novel image reproducing methods have been proposed, wherein an unsharp image signal representing only the structures of low frequencies in a color image, is subtracted from a digital image signal representing the color image. A difference signal is then obtained, processing for changing the image density, saturation, and/or gradation is performed on the difference signal, and a visible image is reproduced by an image reproducing means from the image signal, from the processing of the difference signal. In this manner, even if the contrast of the entire area of the original image is strong, a reproduced image can be obtained such that the contrast of the entire area of the image may be weakened, while retaining the contrasts of fine structures in the highlight and the shadow in the image, and while preventing the details of the highlight and the shadow from becoming imperceptible in the reproduced image due to insufficient gradation. Such image reproducing methods are described in, for example, Japanese Unexamined Patent Publication No. 2(1990)-226375 and U.S. Ser. No. 08/672,939.

In the image reproducing methods descried above, a filtering process is carried out on the image signal by using a low-pass filter to obtain and an unsharp image signal. However, if the size of the low-pass filter is very small, the sharpness of the resulting processed image will be unnaturally emphasized, and effects similar to those obtained with the aforesaid shutting light technique cannot be obtained. Therefore, in the image reproducing methods described above, the filtering process is carried out by using a filter having a comparatively large size (for example, a size of approximately 100×100). However, in cases where the unsharp image signal is formed with the low-pass filter, it is necessary for the processing to be carried out not only along the horizontal direction of the image but also along the vertical direction of the image. Accordingly, for the formation of the unsharp image signal, a number of line memories, equal to the mask size minus 1 must be used (for example, in cases where the filter size is equal to 100×100, 99 line memories must be used). As a result, the size of the apparatus for performing the processing cannot be minimized.

Accordingly, in Japanese Patent Application No. 7(1995)-337509, the applicant proposed a novel image reproducing method, wherein a dynamic range compressing process is used to reduce the size of the apparatus, while ensuring that a printed image having good image quality is thereby obtained. The proposed image reproducing method comprises the steps of: (i) carrying out a filtering process on an image signal with an infinite impulse response filter (IIR filter) to form an unsharp image signal, (ii) carrying out a dynamic range compressing process on the image signal in accordance with the unsharp image signal to obtain a processed image signal, and (iii) reproducing a visible image from the processed image signal.

The shutting light processing, in which the unsharp image is utilized, may be carried out with a digital photo printer system. However, a digital photo printer is a large-scaled apparatus and cannot be freely operated by ordinary users. Therefore, in cases where the shutting light processing, is used in the digital photo printer system, the aforesaid processing, including the shutting light processing, is currently performed by standardized technique in a development laboratory, such as a large-scaled image processing station. However, fundamentally, image correction processing, such as the shutting light processing, must be carried out in accordance with the intentions of the user who took the photograph. If standard processing is carried out in the development laboratory regardless of the user's intention, the shutting light processing cannot be carried out so as to satisfy the user.

For example, persons other than the user, cannot determine exactly which portion (a pattern of a person on the foreground side, a pattern of a person on the background side, a pattern of a person in the sun, a pattern of a person in the shade, or the like) in the photographed scene the user desires to have the most legible gradation.

Therefore, it is desired that the user be able to freely perform the shutting light processing suitable for the intention, with which he took the photograph. However, a digital photo printer system capable of satisfying such a requirement has not heretofore been proposed.

SUMMARY OF THE INVENTION

The primary object of the present invention is to provide an image processing method for use in a digital photo printer system which enables a user to freely perform shutting light processing under desired conditions simply by utilizing the user's personal computer.

Another object of the present invention is to provide an image processing system for carrying out the image processing method.

The present invention provides an image processing method, wherein shutting light processing is carried out under desired conditions in a second image processing apparatus by using a digital image signal, which represents an image before being subjected to the shutting light processing, and which has been formed by a first image processing apparatus, and by using an unsharp image signal, representing an unsharp mask image to be used in the shutting light processing, the method comprising the steps of:

i) in a first image processing apparatus:
forming a digital image signal, representing the image before being subjected to the shutting light processing, and using an unsharp image signal, representing the unsharp mask image to be used an the shutting light processing, wherein the unsharp image signal is obtained from the digital image signal,
performing out compression processing on the unsharp image signal thereby forming a compressed unsharp image signal, and
storing the digital image signal and the compressed unsharp image signal on a storage medium, which is capable of being delivered to a second image processing apparatus, and ii) in the second image processing apparatus:
reproducing the digital image signal and the compressed unsharp image signal received from the storage medium in the first image processing apparatus,
performing decompression processing on the compressed unsharp image signal to obtain a decompressed unsharp image signal, and
performing the shutting light processing by using both the digital image signal and the decompressed unsharp image signal.

The present invention also provides an image processing system for carrying out an image processing method, wherein shutting light processing is carried out under desired conditions in a second image processing apparatus by using a digital image signal, which represents an image before being subjected to the shutting light processing, and which has been formed by a first image processing apparatus, and by using an unsharp image signal, representing an unsharp mask image which is used in the shutting light processing, the system comprising:

i) a first image processing apparatus for:
forming a digital image signal, representing the image before being subjected to the shutting light processing, and using an unsharp image signal, representing the unsharp mask image to be used in the shutting light processing, wherein the unsharp image signal is obtained from the digital image signal, performing out compression processing on the unsharp image signal, thereby forming a compressed unsharp image signal, and storing the digital image signal and the compressed unsharp image signal on a storage medium, which is capable of being delivered to a second image processing apparatus, and ii) a second image processing apparatus for:

reproducing the digital image signal and the compressed unsharp image signal received from the storage medium, performing decompression processing on the compressed unsharp image signal to obtain a decompressed unsharp image signal, and performing shutting light processing by using both the digital image signal and the decompressed unsharp image signal.

In the image processing method and system in accordance with the present invention, by way of example, a thinning-out processing may be employed for use as the compression processing. Also, by way of example, a processing for carrying out image size enlargement to an image size coinciding with the size of the image to be subjected to the shutting light processing may be employed for use as the decomposition processing.

Further, the digital image signal used in the present invention should preferably have characteristics which would prevent details of the image from becoming imperceptible due to insufficient gradation. In such cases, shutting light processing can be carried out in accordance with a wide variety of desires of the users.

With the image processing method and system of the present invention, the digital image signal and the unsharp image signal are formed in a first image processing apparatus such as a large-scaled development laboratory. The digital image signal and the unsharp image signal are then stored in a deliverable storage medium (for example, an MO disk or CD). The stored digital image signal and unsharp image signal may then be delivered from the storage medium to a second image processing apparatus (for example, as a personal computer of the user). In the second image processing apparatus, the digital image signal and the unsharp image signal are reproduced and utilized for performing the shutting light processing. Therefore, the shutting light processing can be carried out freely by the user under desired conditions.

Also, the unsharp image signal is subjected to a thinning-out processing, thereby forming a thinned-out unsharp image signal. The thus formed thinned-out unsharp image signal is stored. Therefore, the storage space of the storage medium required to store the signal can be kept small. The thinned-out unsharp image signal is then subjected to the image size enlargement processing, which is carried out by the user, such that the image size may coincide with the size of the image to be subjected to the shutting light processing. The unsharp image signal, which has been obtained from the image size enlargement processing, is then used for the shutting light processing. Since the unsharp image signal is the one for the shutting light processing, even if the unsharp image signal is subjected to the image size enlargement processing, the image quality of the image, which is ultimately obtained from the shutting light processing, will not be affected adversely.

Further, the digital image signal, which represents the image before being subjected to the shutting light processing, should preferably have the characteristics such that details of the image may become imperceptible due to insufficient gradation. In such cases, the shutting light processing can be carried out in accordance with a wide variety of requirements of the users ranging from a requirement for a high image density to a requirement for a low image density.

DESCRIPTION OF THE PREFERRED EMBODIMENTS

The present invention will hereinbelow be described in further detail with reference to the accompanying drawings.

Figure 1:
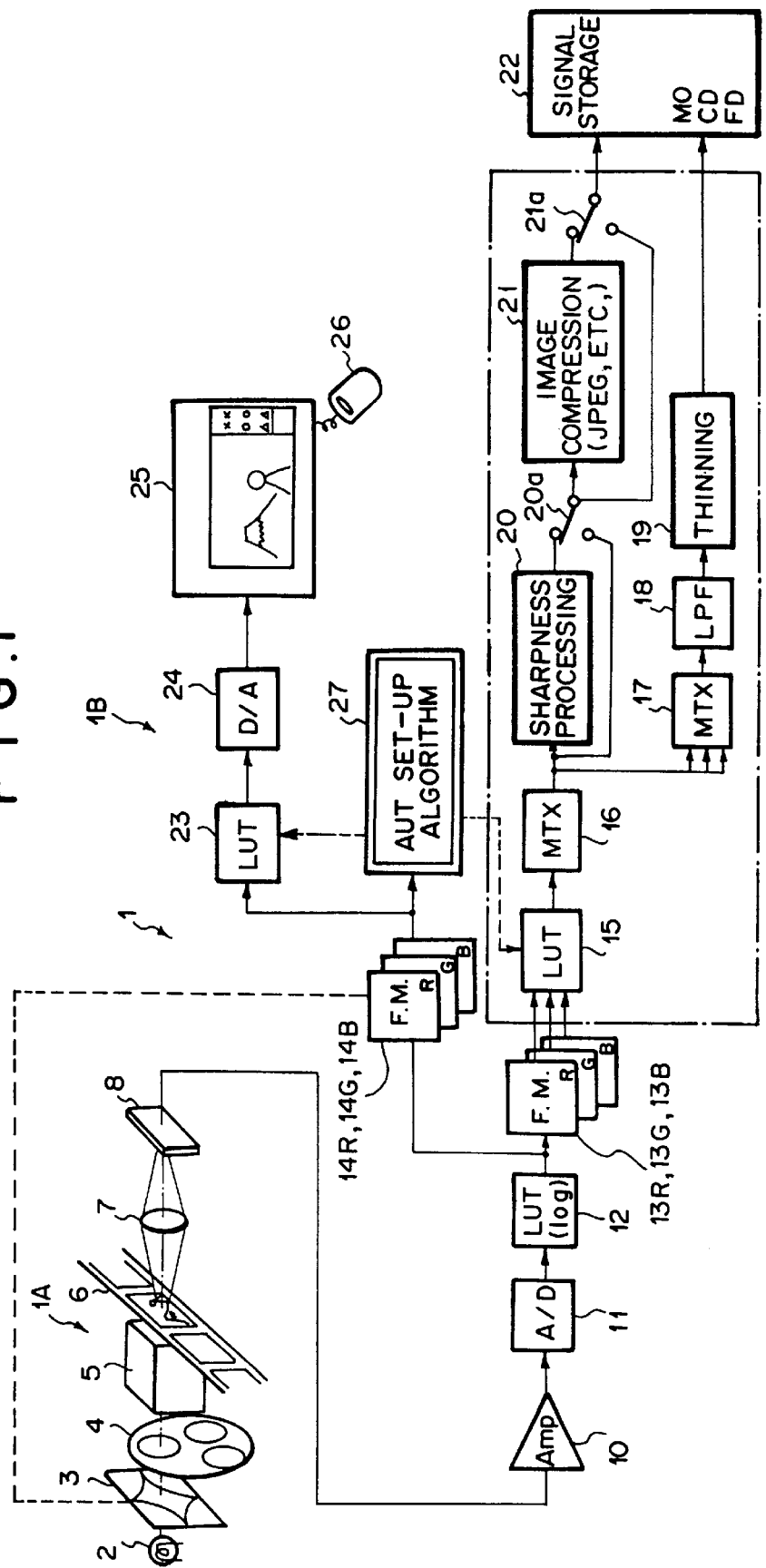
FIG. 1 is an explanatory view showing an example of a first image processing apparatus (for example, a large-scaled development laboratory apparatus used in a digital photo printer system) in which the image processing method and system the present invention are employed.

FIG. 1 is an explanatory view showing an example of the first image processing apparatus, such as a large-scaled development laboratory apparatus, in a digital photo printer system, in which the image processing method and system of the present invention are employed. As illustrated in FIG. 1, a first image processing apparatus 1 comprises an image read-out section 1A and an image processing section 1B. The image readout section 1A comprises a light source 2, and a light regulating means 3 for adjusting the amount of light having been produced by the light source 2. The image read-out section 1A also comprises an RGB filter 4 for converting the light, which has been produced by the light source 2, into R, G, and B three colors, and a mirror box 5 for diffusing the light, which has passed through the RGB filter 4, and irradiating it to film 6. The image read-out section 1A further comprises a lens 7 for forming an image of the light, which has passed through the film 6, on an area type of CCD image sensor 8. In this embodiment, the image read-out operation is carried out with the area type of CCD image sensor 8. Alternatively, a technique for moving a line sensor with respect to the light may be employed. As another alternative, a technique for spot photometry using a drum scanner, or the like, may be employed. In the image read-out section 1A, a preliminary read-out operation and a final read-out operation are carried out. In the preliminary read-out operation, the detection intervals of the CCD image sensor 8 are set to be comparatively coarse, and a preliminary read-out image signal SP is thereby obtained. After the preliminary read-out operation has been carried out, the final read-out operation is carried out. In the final read-out operation, the detection intervals of the CCD image sensor 8 are set to be comparatively fine, and a final read-out image signal SQ is thereby obtained.

The image processing section 1B comprises an amplifier 10 for amplifying the R, G, and B three color image signals, which have been detected by the CCD image sensor 8, and an analog-to-digital converter 11 for converting the amplified image signals into digital image signals. The image processing section 1B also comprises a look-up table (LUT) 12 for converting the digital image signals into image density signals, and frame memories 13R, 13G, and 13B, which respectively store the R, G, and B digital image signals having been converted into the image density signals. The image processing section 1B further comprises frame memories 14R, 14G, and 14B for respectively storing R, G, and B preliminary read-out image signals SP, which are obtained in cases where the preliminary read-out operation is carried out. The image processing section 1B still further comprises an LUT 15 for carrying out correction of gray balance, brightness, and gradation, which will be described later, on the digital image signals, and a matrix (MTX) 16 for correcting the image signals, which have been obtained from the processing carried out by the LUT 15, such that they may become the color signals capable of being reproduced in appropriate colors on a photosensitive material, which will be described later. The image processing section 1B also comprises an MTX 17 for converting the image signals, which have been corrected by the MTX 16, into a luminous signal, and a low-pass filter (LPF) 18 for forming an unsharp image signal from the luminous signal. The image processing section 1B further comprises a thinning-out circuit 19 for thinning out the unsharp image signal to, for example, 1/16. The image processing section 1B still further comprises a sharpness processing means 20 for carrying out sharpness processing on the image signals, which have been corrected by the MTX 16, and a change-over means 20a for turning the sharpness processing on and off. The image processing section 1B also comprises an image compression processing means 21, such as a JPEG, for carrying out image compression on the output obtained via the change-over means 20a, and a change-over means 21a for turning the image compression on and off. The image processing section 1B further comprises a storage means for storing the output image signals, i.e. the digital image signals representing the image before being subjected to the shutting light processing and the thinned-out unsharp image signal, on a portable storage medium 22, such as MO, CD, or FD. The image processing section 1B still further comprises an LUT 23 for correcting the gradation of the preliminary read-out image signals SP, and a digital-to-analog converter 24 for converting the preliminary read-out image signals SP, which have been obtained from the gradation correction carried out by the LUT 23, into analog signals. The image processing section 1B also comprises a CRT display device 25 for reproducing a visible image from the preliminary read-out image signals SP having been obtained from the digital-to-analog conversion, and a mouse device 26 for operating the visible image, which is displayed on the CRT display device 25, in order to set ultimate parameters for the image. The image processing section 1B further comprises an automatic set-up algorithm means 27 for calculating the histogram of the preliminary read-out image signals SP in the manner, which will be described later, and setting the parameters for the adjustments of the LUT 15 and the LUT 23 in accordance with the histogram.

Figure 2A:
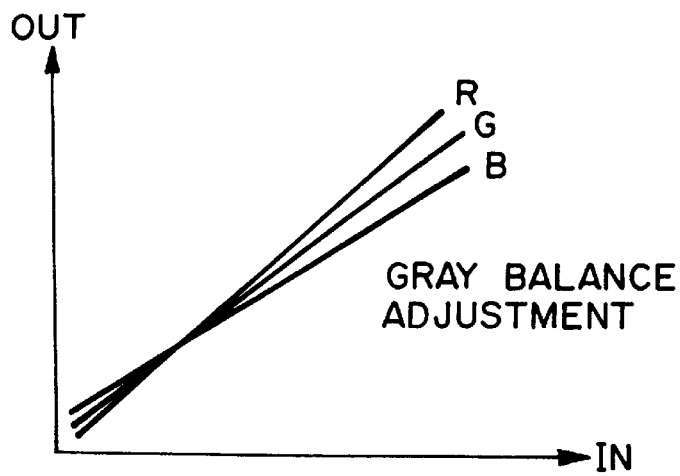
FIG. 2A is a graph showing a table for gray balance adjustment.
Figure 2B:
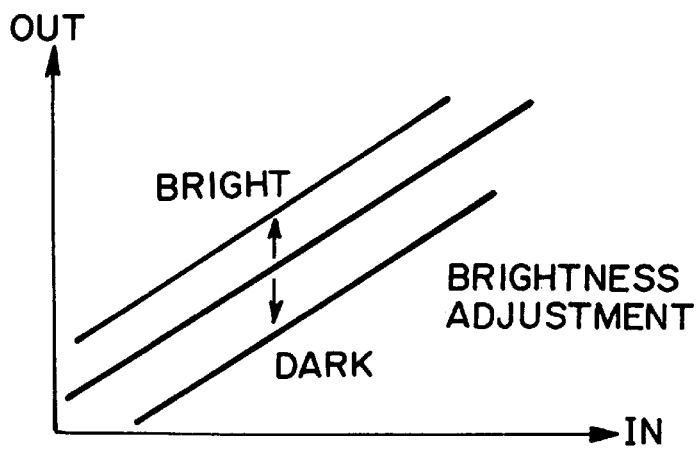
FIG. 2B is a graph showing a table for brightness correction.
Figure 2C:
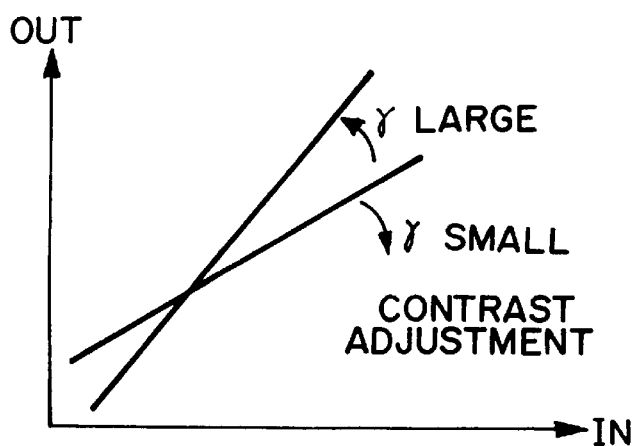
FIG. 2C is a graph showing a table for contrast (y) correction.

The LUT 12 is a transmittance-to-image density conversion table for converting the signals such that saturation may not be reached with respect to the image density range of the original image. The LUT 15 corrects the gray balance, the brightness, and the gradation. The LUT 15 comprises a gray balance adjustment table shown in FIG. 2A, a brightness correction table shown in FIG. 2B, and a contrast (γ) correction table shown in FIG. 2C, which are connected in series. The outputs of the LUT 15 are the image signals, which are linear with respect to the film image density and have the characteristics such that the details on the highlight side and the shadow side may not become imperceptible due to insufficient gradation. The thinning-out circuit 19 carries out the thinning-out processing to the extent such that the information may not be lost. Since the cut-off frequency $\omega_s$ of the low-pass filter (LPF) 18 for forming the unsharp mask is approximately 0.19 (rad/s), the value of $\pi/\omega_s$ is theoretically equal to approximately 16. Therefore, even if the unsharp image signal is thinned out to 1/16, the information, which the unsharp image signal carries, will not be lost. The LUT 23 stores a linear gradation conversion table.

The MTX 16 corrects the detected digital image signals such that they may become the color signals capable of being reproduced in appropriate colors on the photosensitive material. Specifically, the MTX 16 corrects the detected digital image signals such that they may be reproduced in appropriate colors by the combination of the spectral characteristics of the film 6 and the spectral characteristics of the photosensitive material, on which the visible image is reproduced ultimately. The MTX 17 converts the R, G, and B color image signals into a luminous signal. Specifically, the MTX 17 converts the R, G, and B color image signals into the luminous signal by using a value of one-third of the mean value of each color image signal or by using the YIQ base, or the like.

The LPF 18 carries out a filtering process for blurring the image signal in two-dimensional directions.

Figure 3:
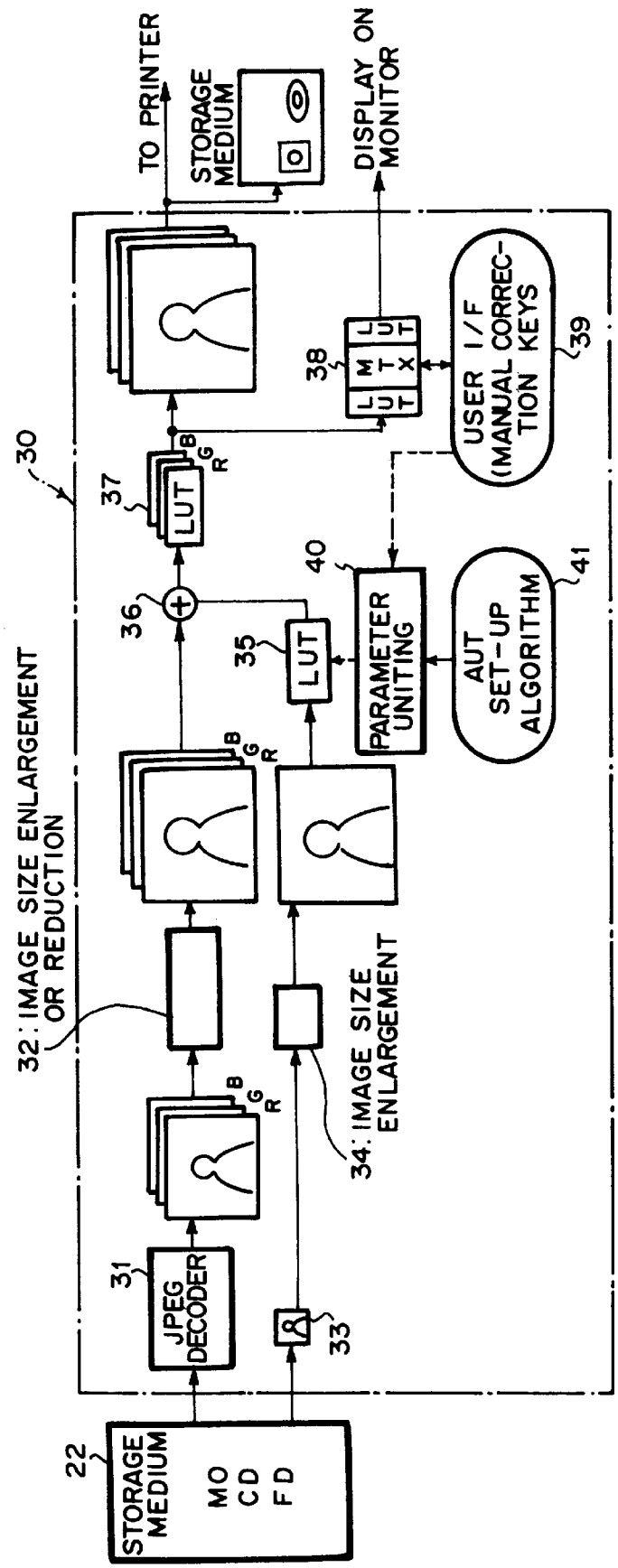
FIG. 3 is an explanatory view showing an example of the second image processing apparatus (for example, a personal computer used by the user side, in the digital photo printer system) in which the image processing method and system of the present invention are employed.

FIG. 3 is an explanatory view showing an example of the second image processing apparatus, such as a personal computer, which is used on a user side, in the digital photo printer system, in which the image processing method and system in accordance with the present invention are employed. As illustrated in FIG. 3, a second image processing apparatus 30 comprises a JPEG decoder 31 for reading and reproducing the digital image signals from the portable storage medium 22, such as MO, CD, or FD, on which the digital image signals representing the image before being subjected to the shutting light processing and the thinned-out unsharp image signal have been stored. The second image processing apparatus 30 also comprises an image size enlargement or reduction processing means 32 for carrying out an image size enlargement or reduction processing on the thus reproduced R, G, and B image signals such that a desired image size may be obtained. The second image processing apparatus 30 further comprises a decoder 33 for reading the unsharp image signal from the storage medium 22 and obtaining the unsharp mask image for the shutting light processing, and an image size enlargement processing means 34 for enlarging the size of the unsharp mask image to the same size as that of the image, which is represented by the digital image signals having been obtained from the image size enlargement or reduction processing carried out by the image size enlargement or reduction processing means 32. The second image processing apparatus 30 still further comprises an LUT 35 for carrying out dynamic range compression processing on the output of the image size enlargement processing means 34, and an adder 36 for carrying out the shutting light processing. In the shutting light processing, the output of the LUT 35 is added to the digital image signals, which have been obtained from the image size enlargement or reduction processing carried out by the image size enlargement or reduction processing means 32, and the shutting light effects are thereby obtained. The second image processing apparatus 30 also comprises an LUT 37 for carrying out gradation processing on the output of the adder 36 in order to obtain the standard gradation, and a converter 38 constituted of LUTs and a MTX for performing desired processing on the output of the LUT 37 and thereby obtaining an image, which is to be displayed on a monitor. The second image processing apparatus 30 further comprises a manual correction keys 39 for inputting parameters for the desired processing into the converter 38, a parameter uniting means 40 for uniting the parameters corrected with the manual correction keys, and an automatic set-up algorithm means 41 for uniting and setting the parameters.

With the image processing method and system in of the present invention, which are constituted in the manner described above, the digital image signals, which represent the image before being subjected to the shutting light processing, and the unsharp image signal are formed in the first image processing apparatus 1, such as a large-scaled development laboratory apparatus. The digital image signals and the unsharp image signal are stored on the storage medium 22, which can be delivered, such as MO or CD. The storage medium 22, on which the digital image signals and the unsharp image signal have been stored, is delivered to the second image processing apparatus 30, such as a personal computer of the user. In the second image processing apparatus 30, the digital image signals and the unsharp image signal are reproduced and utilized for carrying out the shutting light processing. The conditions under which the shutting light processing performed may be adjusted with manual correction keys 39, in accordance with the desires of the user. Therefore, the shutting light processing can be carried out freely by the user and under any desired conditions.

Also, the unsharp image signal is subjected to a thinning-out processing, thereby forming the thinned-out unsharp image signal. The thus formed thinned-out unsharp image signal is then stored. Therefore, the storage space of the storage medium required to store the signal may be minimized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing method for use in shutting light processing, comprising:
    forming an unsharp image signal in a first image processing apparatus, which represents an unsharp mask image to be used for the shutting light processing, wherein the unsharp image signal is formed from an original digital image signal to be used for the shutting light processing;
    performing compression processing on the unsharp image signal and the original digital image signal, a compressed unsharp image signal and compressed original digital image signal being thereby formed in the first image processing apparatus; and
    reproducing the compressed unsharp image and original digital image signals in a second image processing apparatus;
    performing decompression processing on said compressed unsharp image and original digital image signals, a decompressed unsharp image signal and a decompressed original digital image signal being thereby obtained in said second image processing apparatus; and
    performing shutting light processing by combining the decompressed unsharp image signal with the decompressed original digital image signal in the second image processing apparatus.

2. A method as defined in claim 1 wherein the compression processing is a thinning-out processing.

3. A method as defined in claim 1 wherein the decompression processing is a processing for enlarging the decompressed unsharp image to a size coinciding to that of the decompressed digital image to be subjected to shutting light processing.

4. A method as defined in claim 1 wherein the digital image signal, which represents the image before being subjected to shutting light processing, has gradation characteristics such that details of the image are maintained both in a highlight and shadow side of said digital image.

5. A method as defined in claim 1 wherein the first image processing apparatus is a large-scaled image processing station, and the second image processing apparatus is a personal computer.

6. An image processing system which utilizes shutting light processing, comprising:
    i) a first image processing apparatus including:
        forming means for forming an unsharp image signal, which represents the unsharp mask image to be used for the shutting light processing, wherein the unsharp image signal is obtained from an original digital image signal;
        compression processing means for performing compression processing on the unsharp image signal to form a compressed unsharp image signal, and for performing compression processing on the original digital image signal to form a compressed original digital image signal; and
    ii) a second image processing apparatus including:
        reproducing means for reproducing the compressed original digital image signal and the compressed unsharp image signal;
        decompression processing means for performing decompression processing on the compressed unsharp image signal to obtain a decompressed unsharp image signal, and for performing decompression processing on the compressed original digital image signal to obtain a decompressed original digital image signal; and
        processing means for performing shutting light processing by combining the decompressed unsharp image signal with the decompressed original digital image signal.

7. A system as defined in claim 6 wherein said compression processing means is a thinning-out processor.

8. A system as defined in claim 6 wherein said decompression processing means for the unsharp image is an image enlargement processor for enlarging the decompressed unsharp image to a size coinciding with that of the digital image to be subjected to the shutting light processing.

9. A system as defined in claim 6 wherein the digital image signal, which represents the image before being subjected to shutting light processing, has gradation characteristics such that details of the image are maintained both in a highlight and shadow side of said digital image.

10. A system as defined in claim 6 wherein the first image processing apparatus is a large-scaled image processing station, and the second image processing apparatus is a personal computer.

11. An image processing method for use in shutting light processing, comprising:
    forming an unsharp image signal in a first image processing apparatus, which represents an unsharp mask image to be used for the shutting light processing, wherein said unsharp image signal is formed from an original digital image signal to be used for the shutting light processing;

performing compression processing on said unsharp and original digital image signals, a compressed unsharp image signal and a compressed original digital image signal being thereby formed in said first image processing apparatus;

storing said compressed digital image signal and said compressed unsharp image signal on an independent deliverable storage medium; reproducing said compressed unsharp and original digital image signals in a second image processing apparatus;

performing decompression processing on said compressed unsharp and original digital image signals, a decompressed unsharp image signal and a compressed original digital image signal being thereby obtained in said second image processing apparatus; and performing shutting light processing by combining said decompressed unsharp image signal with said decompressed original digital image signal.

12. An image processing method for use in shutting light processing, comprising:

forming unsharp image signals in a first image processor, wherein the unsharp image signals are obtained from original digital image signals used for said shutting light processing;

performing image compressing of the unsharp and original digital image signals;

accessing the compressed unsharp and original digital image signals with a reproducing section of a second image processor;

decompressing the compressed unsharp and original digital image signals with a decompression section; and processing the decompressed unsharp and original digital image signals received from said decompression section with a shutting light processing means.

13. The method of claim 12, further including:

selectively inputting desired information to the shutting light processing section in the second image processor, wherein the desired information is input by a user of the second image processor.

14. The method of claim 12, wherein the step of performing image compressing of the unsharp image signals further includes thinning-out processing.

15. The method of claim 12, further including:

forming digital image signals in the first image processor, wherein the unsharp signals are formed from the digital signals;

image compressing the unsharp and original digital image signals;

accessing said compressed digital image signals separately from said compressed unsharp image signals, said accessing done in a second image processor; and combining said decompressed unsharp and original digital image signals within a shutting light processing section.

16. The method of claim 15, wherein decompressing the unsharp image further includes enlarging the decompressed unsharp image signals to a size equal to that of the digital image signals sent to the shutting light processing section.

17. The method of claim 12, wherein the first image processor is an image processing laboratory and the second image processor is a personal computer.

18. A method of producing a compressed unsharp image, comprising:

forming an unsharp image signal from an input original digital image signal of an original digital image, wherein a mask image representing the unsharp image signal is to be combined with said original digital image signal in the reproduction of the original digital image;

compressing the unsharp and original digital image signals separately from one another; and storing the compressed unsharp and original digital image signals, wherein the compressing step is performed after the forming step so that information carried by said unsharp image signal will not be lost during compression.

19. An image processing system, comprising:

a processor for forming an unsharp image signal from an input original digital image signal, wherein a mask image representing the unsharp image signal is to be combined with said original digital image signal in the reproduction of an original image; and a compressing unit for separately compressing the unsharp and original digital image signals, wherein the unsharp and original digital image signals are compressed after the unsharp image signal is formed so that information carried by said unsharp image signal will not be lost during compression.

20. The method of claim 1, further including storing the digital image signal and compressed unsharp image signal in a memory of the first image processing apparatus.

21. A system as defined in claim 6, further including a memory in the first image processing apparatus for storing the digital image signal and compressed unsharp image signal.

22. An image processing system which utilizes shutting light processing, comprising:

a first image processing apparatus including:

a forming section for forming an unsharp image signal which represents an unsharp mask image to be used for the shutting light processing, wherein said unsharp image signal is obtained from [a] an original digital image signal;

a compression processing section for performing compression processing on said unsharp image signal to form a compressed unsharp image signal, and for performing parallel compression processing on said original digital image signal to form a compressed original digital image signal; and an independent deliverable storage medium for storing said compressed digital image signal and said compressed unsharp image signal; and a second image processing apparatus including:

a reproducing section for reproducing said compressed digital image signal and said compressed unsharp image signal;

a decompression processing section for performing decompression processing on said compressed unsharp image signal to obtain a decompressed unsharp image signal, and for performing parallel decompression processing on said compressed original digital image signal to obtain a decompressed original digital image signal; and a shutting light processing section for performing shutting light processing by combining said decompressed unsharp image signal with said decompressed original digital image signal.

* * * * *